I. SNOW.
FEELER MECHANISM FOR LOOMS.
APPLICATION FILED DEC. 10, 1919.
1,378,909.
Patented May 24, 1921.
2 SHEETS—SHEET 1.
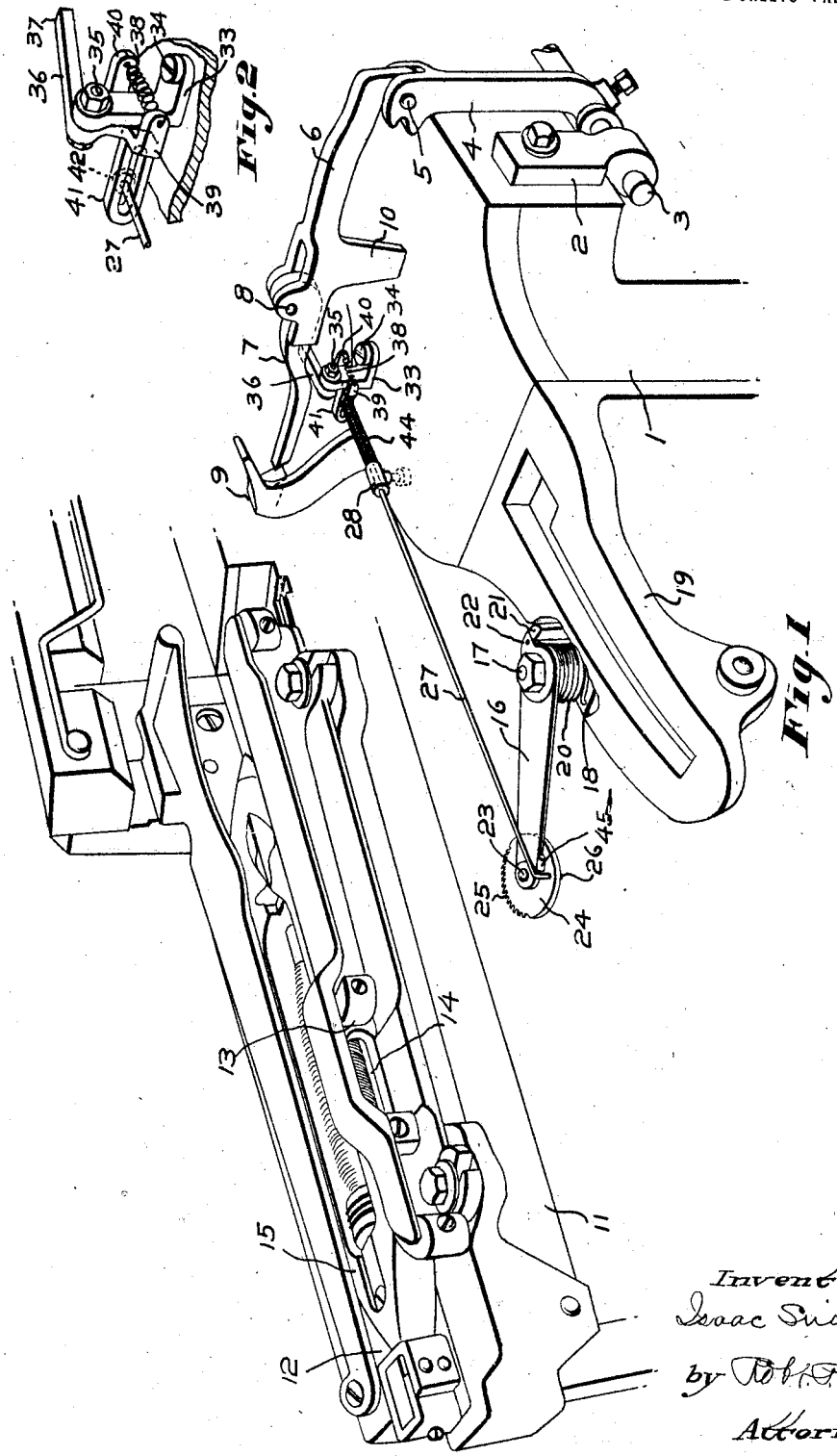
Inventor:
Isaac Snow
by Robt P Harris,
Attorney

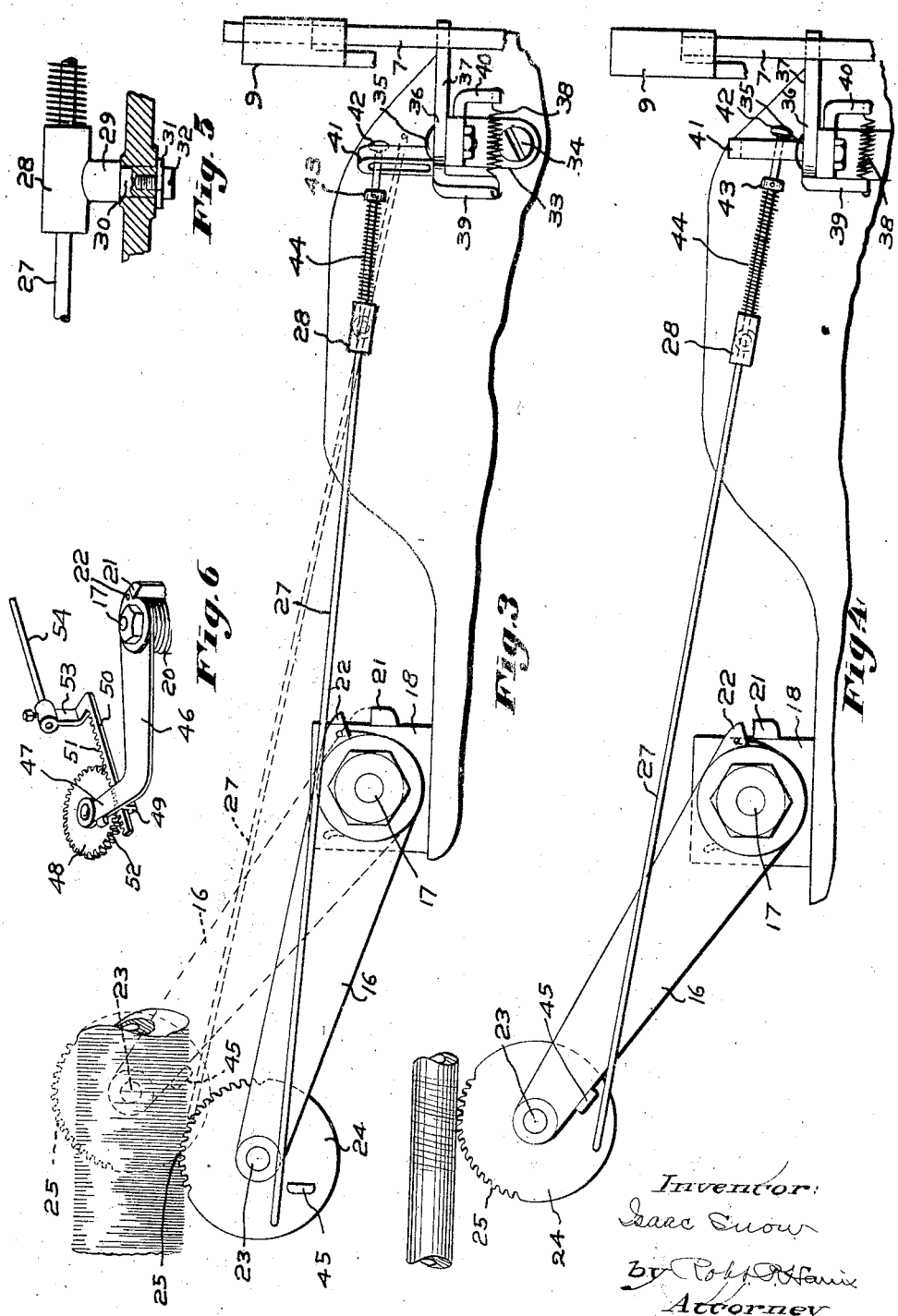

UNITED STATES PATENT OFFICE.

ISAAC SNOW, OF LAWRENCE, MASSACHUSETTS, ASSIGNOR TO DRAPER CORPORATION, OF HOPEDALE, MASSACHUSETTS, A CORPORATION OF MAINE.

FEELER MECHANISM FOR LOOMS.

1,378,909.

Specification of Letters Patent.

Patented May 24, 1921.

Application filed December 10, 1919. Serial No. 343,722.

*To all whom it may concern:*

Be it known that I, ISAAC SNOW, a citizen of the United States, and a resident of Lawrence, in the county of Essex and State of Massachusetts, have invented an Improvement in Feeler Mechanisms for Looms, of which the following description, in connection with the accompanying drawings, is a specification, like characters on the drawings representing like parts.

The invention to be hereinafter described relates to feeler mechanisms for looms, whereby, when the filling becomes substantially exhausted but before complete exhaustion, filling replenishment is effected.

Various forms of feeler mechanisms have heretofore been suggested for accomplishing the desired end, and some of these have satisfactorily performed their desired functions. In feeler mechanisms, however, one of the objects sought is to call the change or replenishment when the amount of filling in the shuttle has reached a desired minimum without causing undue or unnecessary waste of yarn.

The object of the present invention is to provide a feeler mechanism which shall be sensitive either to the presence or absence of filling in the shuttle, and which will call the change when the desired minimum amount of filling has been reached. In carrying the invention into practical effect, a feeler carrier is mounted upon a support for swinging movement toward and from the front of the loom and carries at its free or swinging end a feeler tip having toothed portions and which is normally obstructed from pivotal movement relative to the feeler carrier, but which, on a detecting beat, is turned relative to the feeler carrier to prevent replenishment of filling and only permit replenishment to be effected when the feeler tip fails to be turned relative to the feeler carrier on a detecting beat. The feeler tip is preferably made as a toothed wheel either partly or wholly and is normally under the influence of a spring and a stop tending to hold the feeler tip from movement relative to the feeler carrier on a detecting beat, and such means is so contrived that when a working supply of filling is present in the shuttle and is engaged by the teeth of the feeler tip, on a detecting beat, the feeler tip will be turned or moved relative to the carrier as both move frontwardly under the impulse or frontward push of the surface within the shuttle, and advantage is taken of the relative turning movement of the feeler tip and feeler carrier to prevent a change of filling and permit it only when the feeler tip fails to be turned relative to the feeler carrier on a detecting beat.

In the drawings:

Figure 1 is a perspective view of the detecting side of the loom, some of the parts being omitted;

Fig. 2 is a detail on an enlarged scale showing the latch controller;

Fig. 3 is an enlarged plan view showing the action of the feeler mechanism when a working supply of filling is present in the shuttle on a detecting beat;

Fig. 4 is a view similar to that of Fig. 3 but showing the action of the feeler mechanism when the filling is substantially exhausted;

Fig. 5 is a detail partly in section showing the supporting and pivotal means for the transmitter;

Fig. 6 is a perspective view of a modification.

The loom frame 1 has secured thereto the brackets 2, one at each side of the loom frame for supporting the transverse or rock shaft 3 which is normally under the influence of a spring and is connected to the filling replenishing mechanism, as usual in this type of looms, and being well understood in the art a description of these features is not herein attempted.

Rising from the rock shaft 3 is an arm 4 to which is pivoted at 5 the arm 6 carrying the latch 7 which may be conveniently pivoted to the arm 6 at 8. The rear end of the latch 7 is adapted to be engaged at times when filling is to be replenished, by an actuator 9 which may be either the weft hammer or a part connected thereto.

The arm 6 may be conveniently supported for movement toward and from the front of the loom by a rest or lug 10 which, as shown in Fig. 1, rests upon the top of the loom frame.

The lay 11 may be of usual character and is provided with the shuttle box 12, the front wall of which is slotted at 13 to register with a slot 14 in the front or adjacent wall of the shuttle 15 when it is positioned in the box at the detecting side of the loom.

A feeler carrier is provided which may be pivotally mounted upon a convenient support. In the present instance the feeler carrier 16 is formed as a swinging arm pivotally mounted on a stud 17 rising from a bracket 18 secured to the loom frame or shipper stand 19. The feeler carrier 16 is under the influence of a spring 20 which normally acts to hold the feeler carrier 16 in its rearward position, as indicated in Fig. 1, and a stop 21 is provided for engagement by a lug 22 mounted on the feeler carrier to define the rearward position of the free end of the feeler carrier when the latter is in its normal rearward feeling position.

Pivotally mounted on the feeler carrier at 23 is a feeler tip which is preferably formed as a wheel 24 having a toothed portion 25 for entering the shuttle and engaging a surface therein on each detecting beat. The teeth 25 may be variously formed, but are conveniently made of sufficient penetrating character to enter into the filling under the frontward pressure thereof against the teeth as the lay moves frontwardly on a detecting beat.

The toothed wheel 24 has connected thereto at 26 a transmitter or rod 27 which passes transversely of the loom through a swivel support 28 and has connected at its end beyond the support 28 a hatch controller. The pivotal support for the transmitter 27 is shown on an enlarged scale in Fig. 5 and comprises a sleeve having extending downwardly therefrom a shouldered portion 29 and a pin 30, a suitable washer 31 and securing bolt 32 being provided to hold the support or sleeve in position with permissive pivotal or turning movement on the stud 30.

Rising from the loom frame is a stand or support 33 which may be secured in place by a suitable bolt 34 and has pivotally mounted thereon at 35 the latch controller 36, the end 37 of which extends under the latch 7, substantially as indicated in Fig. 1. A spring 38, shown herein as of the "pull" type, normally holds the latch controller 36 with its end 37 raised with the latch 7 in position for engagement with the operating member 9. The latch controller 36 has a downwardly extending portion 39 between which and a fixed lug 40 on the stand 33 the pull spring 38 is situated, the construction being such that when the latch controller 36 is not influenced by any other force, the spring 38 will normally hold the end 37 of the latch controller raised with the part 39 resting against the upright portion of the support 33. Extending laterally from the latch controller 36 is a slotted arm 41 through which extends the end of the transmitter 27, the end of the transmitter beyond the slotted arm 40 being provided with a head 42. Adjustably secured to the transmitter 27 is a collar 43 between which and the sleeve or support 28 is interposed the expansion spring 44, the construction being such that the transmitter 27 is normally under the influence of the spring 44 tending to move the transmitter to the right, Figs. 1, 3 and 4. The feeler tip is provided with a stop to limit the action of the spring 44, and in the present instance, as indicated in Fig. 1, the stop is in the form of a shoulder 45 rising from the toothed wheel 44, said shoulder resting normally against the side of the feeler carrier 16 when the parts are in normal feeling position, as indicated in Fig. 1.

When a working supply of filling is present in the shuttle on a detecting beat, the teeth of the wheel 24 will engage and sink into the filling, and as the lay moves farther frontwardly, the feeler carrier will be pushed frontwardly and the wheel will be turned on its pivotal mounting relative to the feeler carrier. The effect of this is to act through the transmitter 27 to bring the head 42 against the slotted arm 41 of the latch controller and cause the latch controller to be turned clockwise upon its pivotal support and thereby permit the latch 7 to drop or be moved out of the path of the operating member 9. When, however, the filling is substantially exhausted on a detecting beat, the teeth of the toothed wheel 24 will be engaged by the substantially denuded surface of the filling carrier and will no longer hold the wheel and cause its turning movement relative to the feeler carrier as the lay continues its frontward movement. The effect is that the transmitter 27 will not be moved sufficiently, as the feeler carrier moves frontwardly, to turn the latch controller clockwise as before, and the latch 7 will remain lifted and in the path of movement of the operating member 9, with the result that filling replenishment will be effected.

The action of the parts when a working supply of filling is present in the shuttle, is indicated in Fig. 3, wherein it will be noted that as the lay moves frontwardly on a detecting beat, the toothed wheel will be rotated relative to the feeler carrier as the lay moves frontwardly and will exert a pull on the transmitter 27 to prevent replenishment of filling as hereinbefore described. When filling is substantially exhausted, however, on a detecting beat, as indicated by Fig. 4, the toothed wheel will not be turned relative to the feeler carrier as they both move frontwardly and the transmitter will fail to be moved sufficiently far by the turning movement of the feeler carrier on its pivot to actuate the latch controller and filling replenishment will be called.

Instead of transmitting movement from the toothed wheel or feeler tip by the form of transmitter hereinbefore described, it may be done by a rack and pinion, for instance, as illustrated in Fig. 6, wherein the feeler carrier 46 is pivotally mounted as before, but is provided with a rearwardly extending end portion 47 which may be bifurcated to support the toothed wheel 48 and afford a guide, as at 49, for a rack 50, the teeth 51 of which are adapted to engage corresponding toothed portions 52 on a part of the toothed wheel 48, it being understood that the teeth on the filling engaging portion of the toothed wheel 48 may be relatively sharp in order to properly engage and sink into the filling. The rack 50 may be connected by an arm 53 to a rod 54 which constitutes the transmitter and is connected, as hereinbefore described with reference to the transmitter 27, to the latch controller.

Claims:

1. In a feeler mechanism for looms, the combination of a feeler carrier pivotally supported by the loom frame for swinging movement toward and from the front of the loom, a wheel mounted on the swinging end of the feeler carrier and provided with teeth which engage the filling and cause the wheel to be turned relative to the feeler carrier on a detecting beat until the filling is substantially exhausted, and means connected to the toothed wheel for effecting replenishment of filling when the wheel fails to be turned relative to the feeler carrier on a detecting beat.

2. In a feeler mechanism for looms, the combination of a feeler carrier pivotally supported by the loom frame for swinging movement toward and from the front of the loom, a spring normally acting to yieldingly hold the free end of the feeler carrier rearwardly, a wheel mounted on the swinging end of the feeler carrier and provided with teeth which engage the filling and cause the wheel to be turned relative to the feeler carrier on a detecting beat until the filling is substantially exhausted, and means connected to the toothed wheel for effecting replenishment of filling when the wheel fails to be turned relative to the feeler carrier on a detecting beat.

3. A feeler mechanism for looms, comprising, in combination, a feeler carrier mounted for movement toward and from the front of the loom, a toothed wheel supported by the carrier to engage the filling and constructed and arranged to roll along the surface of the filling on a detecting beat when a working supply of filling is present and to slip longitudinally of the filling carrier when filling is substantially exhausted, and means for effecting replenishment of filling when the toothed wheel slips over the surface of the filling carrier.

4. In a filling replenishing loom, the combination of a feeler carrier pivotally supported on the loom frame, a wheel mounted for turning movement relative to the feeler carrier and having a toothed portion which engages the filling and causes the wheel to turn relative to the feeler carrier as the latter swings frontwardly on a detecting beat, means connected to the wheel and tending to turn it as it moves frontwardly, and means for effecting replenishment of filling when the wheel fails to turn relative to the feeler carrier on a detecting beat.

5. In a filling replenishing loom, the combination of a feeler carrier pivotally supported on the loom frame, a wheel mounted for turning movement relative to the feeler carrier and having a toothed portion which engages the filling and causes the wheel to turn relative to the feeler carrier as the latter swings frontwardly on a detecting beat, a transmitter connected to the toothed wheel, a spring tending to prevent turning movement of the wheel relative to the feeler carrier on a detecting beat, and means connected to the transmitter for replenishing filling when the wheel fails to be turned relative to the feeler carrier on a detecting beat.

6. In a filling replenishing loom, the combination of a feeler carrier pivoted to swing toward and from the front of the loom in an arc of a circle, a feeler tip pivotally mounted on the swinging portion of the feeler carrier and having a toothed portion, a transmitter connected to the feeler tip and mounted for movement thereby when the tip is turned upon its pivotal mounting, and means controlled by the transmitter for effecting replenishment of filling when on a detecting beat the feeler tip fails to be turned on its pivot relative to the feeler carrier.

7. In a filling replenishing loom, the combination of a feeler carrier pivoted to swing toward and from the front of the loom in an arc of a circle, a feeler tip pivotally mounted on the swinging portion of the feeler carrier and having a toothed portion, a transmitter connected to the feeler tip and mounted for movement thereby when the tip is turned upon its pivotal mounting, a spring tending to prevent turning movement of the feeler tip relative to the feeler carrier as its swings frontwardly, and means controlled by the transmitter for effecting replenishment of filling when on a detecting beat the feeler tip fails to be turned on its pivot relative to the feeler carrier.

8. In a feeler mechanism for looms, the combination of a pivotally mounted feeler carrier, a filling engaging tip pivotally supported on the feeler carrier for movement frontwardly therewith about the pivot of the feeler carrier and having teeth which engage the filling and cause turning movement of the feeler tip upon the feeler carrier as the latter moves frontwardly, a transmitter connected to the feeler tip, and means for replenishing filling when the feeler tip fails to be turned relative to the feeler carrier on a detecting beat.

9. In a feeler mechanism for looms, a feeler carrier pivotally mounted on the loom frame, a toothed wheel mounted for rotary movement on the feeler carrier, a transmitter connected at one end to the toothed wheel, a latch controller connected to the other end of the transmitter, a spring acting on the toothed wheel through the transmitter, a stop on the toothed wheel acting in connection with the spring to obstruct turning movement of the toothed wheel relative to the feeler carrier as it is moved frontwardly on a detecting beat, and means for effecting replenishment of filling when the toothed wheel fails to be turned relative to the feeler carrier on a detecting beat.

10. A feeler mechanism for looms, comprising, in combination, a feeler carrier mounted for movement toward and from the front of the loom, a toothed wheel supported by the carrier to engage the filling and roll along the surface of the filling on a detecting beat when a working supply of filling is present and to slip along a surface in the shuttle without rolling when filling is substantially exhausted, and filling replenishing mechanism for effecting replenishment of filling when through slippage the wheel fails to roll over a surface in the shuttle.

11. In a feeler motion for looms, the combination of a feeler carrier, a toothed wheel constituting the feeler member rotatably mounted on the carrier and receiving the frontward impact of a surface within the shuttle on each detecting beat by which the toothed wheel and feeler carrier are moved frontwardly, a latch movable to and from position to effect replenishment of filling, and means connected to the toothed wheel for moving the latch to its inoperative position when the toothed wheel is rotated on a detecting beat.

12. A feeler mechanism for looms, comprising, in combination, a toothed wheel supported to engage the filling and roll along the surface of the filling on a detecting beat when a working supply of filling is present and to slip over a surface in the shuttle without rolling when filling is substantially exhausted, and means for effecting replenishment of filling when through slippage the toothed wheel fails to roll over a surface in the shuttle.

13. A feeler mechanism for looms, comprising, in combination, a toothed wheel supported to engage the filling and roll over the surface thereof on a detecting beat in a direction longitudinally of the shuttle when a working supply of filling is present, an actuator connected to the wheel and moved to inoperative position by the rolling movement imparted to the wheel by the filling, and means for effecting replenishment of filling when through slippage the toothed wheel fails to roll over a surface in the shuttle.

14. A feeler mechanism for looms, comprising, in combination, a filling engaging wheel supported to be moved longitudinally of the shuttle upon each detecting beat, teeth upon the periphery of the wheel to engage the filling upon a detecting beat and impart rotary movement to the wheel as it moves longitudinally of the shuttle when a working supply of filling is present, said teeth operable to slide over the filling carrier without rotating the wheel when filling is substantially exhausted, and means for effecting replenishment of filling upon failure of the wheel to rotate on a detecting beat.

In testimony whereof, I have signed my name to this specification.

ISAAC SNOW.